Dec. 31, 1935.　　　F. I. GETTY　　　2,025,981
MULTIPLE CIRCUIT CLOSER FOR STEERING WHEELS
Filed May 29, 1935　　3 Sheets-Sheet 1
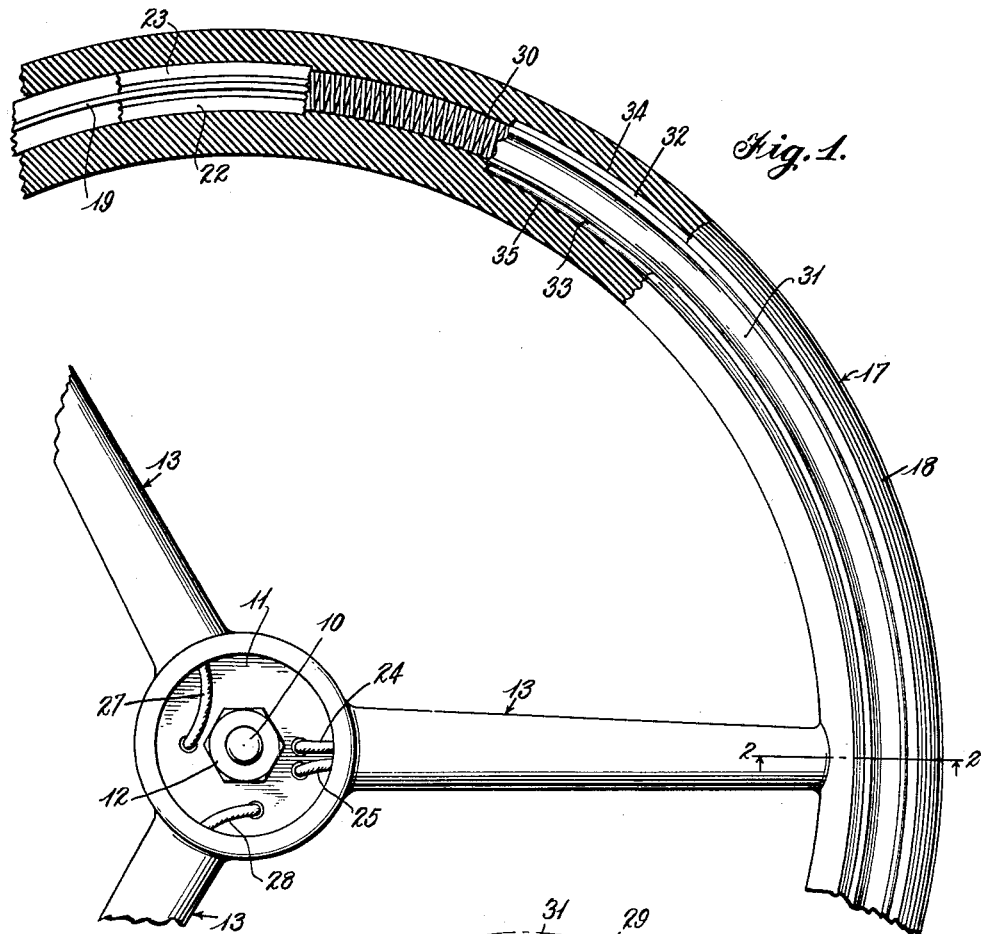
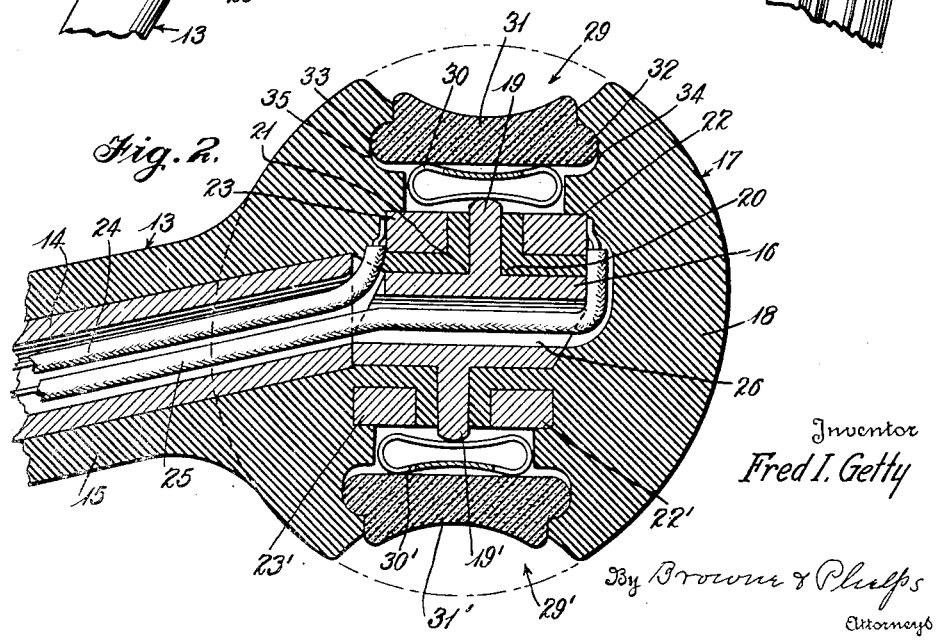
Inventor
Fred I. Getty
By Browne & Phelps
Attorneys

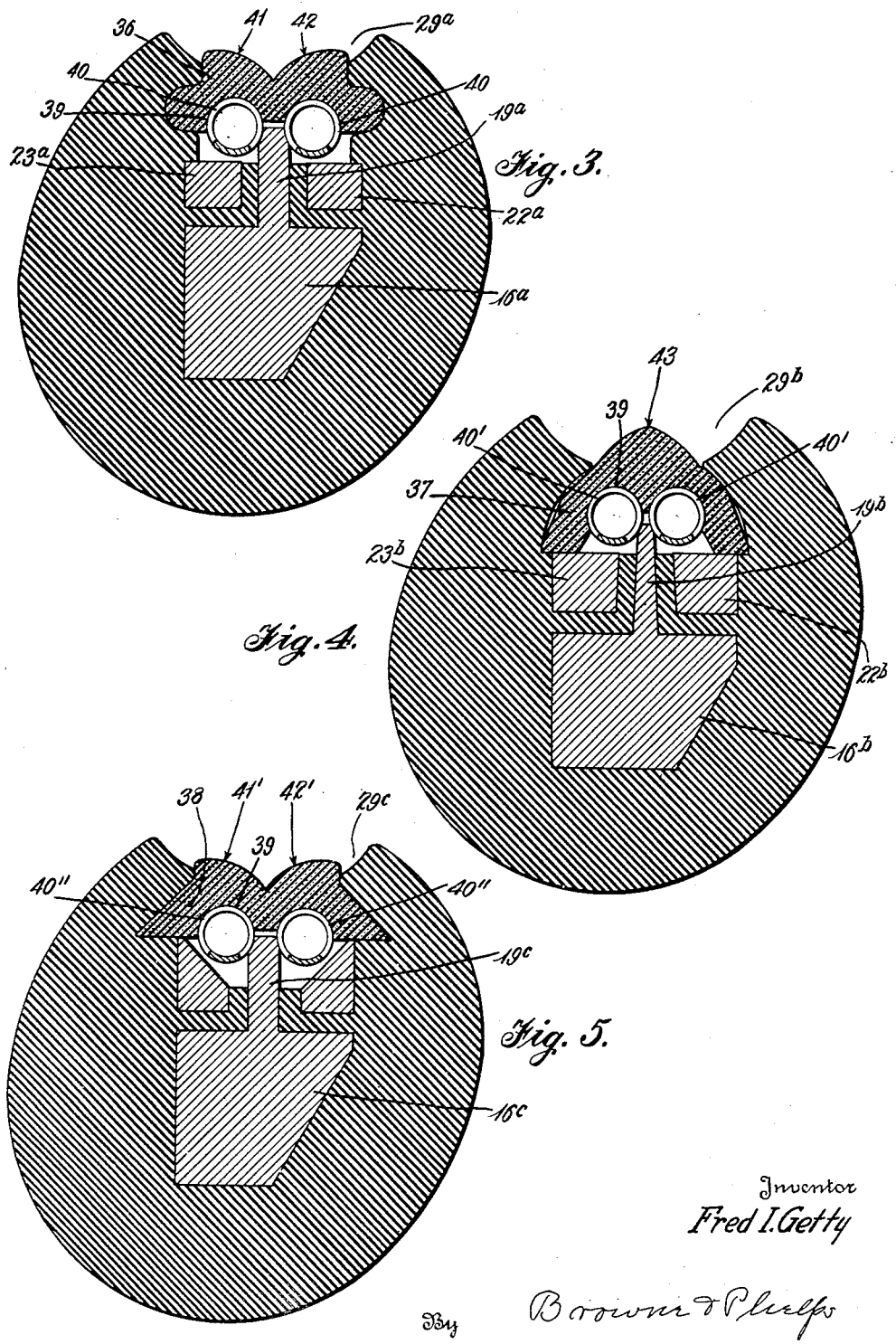

Dec. 31, 1935.  F. I. GETTY  2,025,981
MULTIPLE CIRCUIT CLOSER FOR STEERING WHEELS
Filed May 29, 1935  3 Sheets-Sheet 3

Inventor
Fred I. Getty
By Browne & Phelps
Attorneys

Patented Dec. 31, 1935

2,025,981

UNITED STATES PATENT OFFICE 2,025,981

MULTIPLE CIRCUIT CLOSER FOR STEERING WHEELS

Fred I. Getty, Jennings, La.

Application May 29, 1935, Serial No. 24,117

10 Claims. (Cl. 200—59)

The invention relates to circuit closers and has as an object the provision of a circuit closer which may be installed in a specially constructed rim of a steering wheel whereby to control signal or light accessories of an automobile from the rim of the steering wheel.

It is a further object of the invention to provide a circuit closer adapted to control either of two circuits by pressure at any point about the rim of the wheel at the proper point radially thereof.

It is a further object of the invention to provide a device of this character which will be certain in operation and neat in appearance.

Further objects of the invention will appear from the following description when read in connection with the accompanying drawings showing illustrative embodiments of the invention, and wherein:—

Fig. 1 is a detail plan view of a portion of a steering wheel with a portion of the rim in section;

Fig. 2 is a detail vertical section on line 2—2 of Fig. 1;

Figure 6:
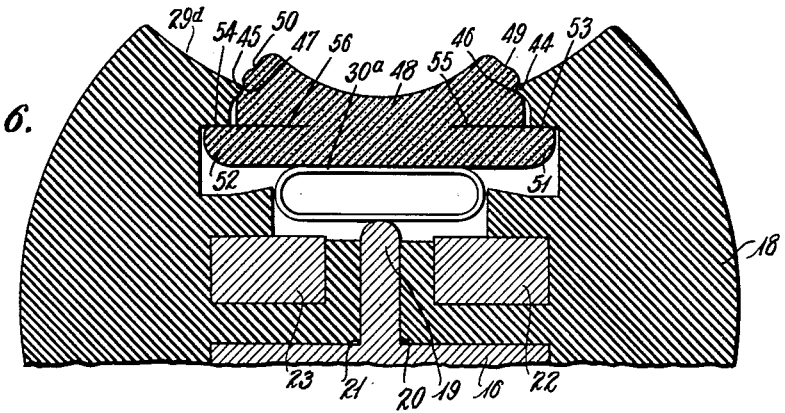
Figure 7:
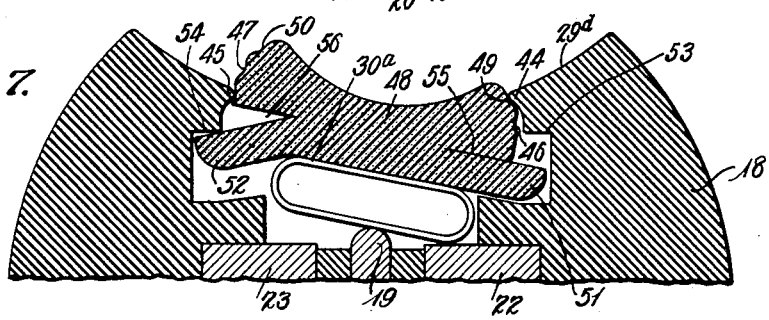
Figure 8:
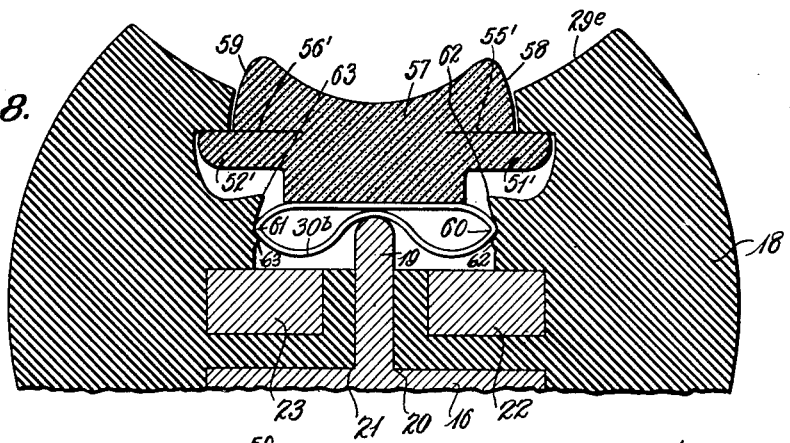

Figs. 3, 4, and 5 are vertical sections transversely through the rim of the wheel showing different forms of the invention;

Fig. 6 is a detail vertical section of a further form of the invention;

Fig. 7 is a similar view of the structure of Fig. 6 showing an operating position;

Fig. 8 is a similar view of a still further form of the invention; and

Figure 9:
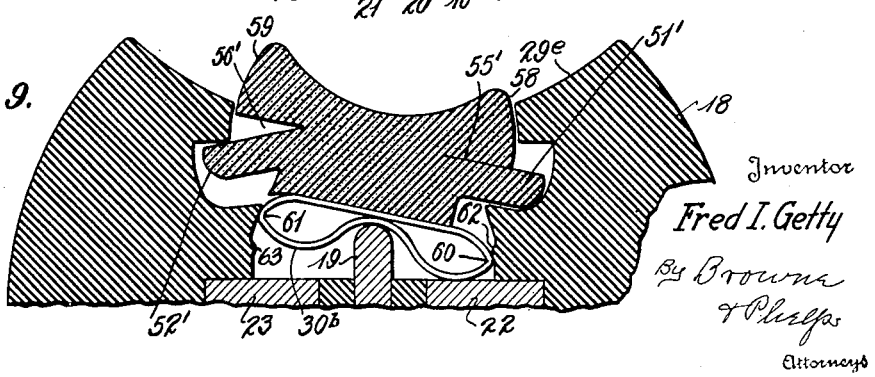

Fig. 9 is a similar view showing an operating position of the structure of Fig. 8.

As shown in Fig. 1, the steering post of an automobile is indicated at 10 and the wheel comprises a hub 11 secured upon said post by means of the nut 12. The spokes 13 of the wheel are desirably formed with metal tubing cores 14, indicated in Fig. 2, with an insulating material covering 15 thereon. The core 14 of the spoke is shown as secured, as by brazing or welding, to a metallic core 16 of the rim 17 of the steering wheel. The core 16 of the rim is shown as surrounded by a covering 18 of insulating material as hard rubber, bakelite or the like.

The metallic core 16 is shown as formed with a pair of ribs 19, 19' projecting laterally therefrom forming with the body of the core the angles 20, 21. Seated in said angles and insulated from the core 16 by the extension of the insulating material 18 into the angle, there are shown rings 22, 23, 22', 23'.

A wire 24 is shown passing through the spoke 14 and attached to ring 23. A second wire 25 is shown passing through the same spoke and through an opening 26 in the core 16 and secured to the ring 22. Wires 27, 28 are shown entering the remaining spokes of the wheel in Fig. 1, which passing through said spokes are secured one to the ring 23' and the remaining one thereof through an opening corresponding to opening 26, Fig. 2, and attached to the ring 22'.

Portions of the rings 22, 23, 22', 23' are exposed in recesses 29, 29' respectively, which recesses open to the rim of the wheel. It will be understood that the recesses 29, 29' the core 16, and the rings 22, 23, 22', 23' are all annuli and extend continuously about the rim of the wheel.

To close a circuit by bridging between the ribs 19 or 19' and the desired ring 22, or 23, 22' or 23', there are shown bridge members 30, 30' which, as indicated in Figure 1, are preferably produced by helical springs flattened down to the form shown in Figure 2. Obviously these bridge members could be made of other forms but for ease of manufacture, flexibility in use, and certainty of operation, the form shown is preferred.

The bridge members 30, 30' are shown as lying upon the ribs 19, 19' with their ends in spaced relation to the rings 22, 23, 22', 23' respectively. To hold the bridge members in central position and to depress the desired sides thereof, there are shown closers for the recesses 29, 29' at 31, 31', which are desirably formed of a partially vulcanized rubber and which are shown as formed with ribs 32, 33 seating in recesses 34, 35 in the side walls of recess 29, it being understood that the closure 31' is similarly formed.

The recesses or grooves 34, 35 are shown as deeper than the ribs 32, 33 to allow for depression of the rib 32, or 33, in the groove.

From the structure as described, it will be seen that pressure upon the closer 31 or 31' at a location at either side of the center will result in closing the corresponding circuit by tilting of the bridge member 30 upon its supporting rib 19, and that the resilience of the bridge member 30 will restore the switch to open circuit condition when the pressure is released.

In the form of the invention shown in Figures 3, 4, and 5, only one pair of circuit closers is shown, desirably formed in the upper surface of the steering wheel rim. As there shown the recesses 29ª, 29ᵇ, 29ᶜ, correspond to the recess 29 in Figure 2, and the core 16ª, 16ᵇ, 16ᶜ of the wheel correspond to the core 16 of Figures 1 and 2, which cores also are formed with the ribs 19ª, 19ᵇ, 19ᶜ.

In each of the forms of Figures 3, 4, and 5, the resilient closers 36, 37, and 38 are formed with recesses in their inner portions as at 39, Figure 3, which recesses are formed upon cylindrical surfaces and embrace an arc of more than one-half of a circle. The bridge members 40 of these forms are formed of helical spring annular bands of the same nature as that shown in Figures 1 and 2, but are left in their cylindrical form, and seating in the recesses 39 are therefore interlocked with the material of the closers 36—38.

The closers 36 are shown as very slightly spaced from the ribs 19a—19c, and the members 40 rest against the upper outer angles of the ribs, said angles being preferably slightly chamfered for the purpose. When so formed, a pressure upon either of the ribs 41, 42 of Figure 3. or 41', 42', of Figure 5, will cause the corresponding bridge member 40 to be depressed into contact with the corresponding rib 22a or 23a.

Figure 4 shows a closer having a central ridge 43. To operate this form, a finger or thumb is pressed upon one side of the ridge and pressure being exerted substantially normal to the slope of the ridge causes the bridge member 40' to be depressed into contact with the ring 22b or 23b.

It is to be understood also that in connection with the forms of Figs. 3, 4, and 5, the cores 16a, 16b, 16c are rings or annuli, as are the rings 22a, 23a, etc. Also that the recesses 29a, 29b, 29c are annular recesses extending completely around the rim of the wheel and that the bridge members 40, 40', 40'' are annular bands of helically wound resilient material.

In the forms of the invention shown in Figs. 6–9 inclusive, means are provided to hold a circuit closed until released by a subsequent act of the operator.

In the form of Figs. 6 and 7, the movable contact 30a formed of helically coiled wire in flattened coils is supported at a central portion on fixed contact 19.

The groove 29d has inward projections 44, 45 which coact with depressions 46, 47, respectively in closure 48 to retain the device in normal open circuit position. When the pressure is applied to the right-hand side of closure 48, the structure of the closure and contact 30a is tilted to the position of Fig. 7 to close a circuit, the projection 44 then seating in depression 49 and the projection 45 pressing into the soft material of the closure. Actuation in the opposite direction will cause projection 45 to enter depression 50 to hold the opposite contacts in engagement. The circuit may be again opened by pressure on the elevated side of closure 48.

To assist in holding the contact 30a and closure 48 in normal position projections 51, 52 are shown formed upon closure 48 and underlying shoulders 53, 54 of the rim 18.

To permit of ease of tilting, cuts 55, 56 are provided flush with the upper surfaces of projections 51, 52.

In the form of Figs. 8 and 9, the closure 57 is formed with plain arcuate surfaces 58, 59, projections 51', 52' and cuts 55', 56', the latter mentioned features acting as in the form of Fig. 7.

The movable contact 30b rests upon central metallic grounded support 19 which latter is given a greater height than in Fig. 6. The contact 30b is deformed to provide points 60, 61 which coact with inward projections 62, 63 to hold the contacts normally open or in an operated position, to be opened by a subsequent action as will be readily apparent.

Minor changes may be made in the physical embodiments of the invention within the scope of the appended claims without departing from the spirit thereof.

I claim:
1. A multiple circuit closer for steering wheels comprising, in combination: a wheel rim formed with an annular groove; a metallic core for said rim presenting an annular contact portion standing centrally of said groove; a pair of metallic contact rings exposed in said groove concentric with said annular portion at respective sides thereof and insulated therefrom; and resilient annular bridging means resting upon said annular portion and depressible at either side thereof and at any point about the rim to close a desired circuit.

2. A multiple circuit closer for steering wheels comprising, in combination: a wheel rim having an annular groove; a pair of insulated contact rings exposed in said groove to be placed in connection with individual circuit portions; annular supporting means projecting into said groove between said rings; annular-band, contact means supported on said annular means for depression at either side thereof and at any point about the rim into contact with a desired ring; and means to connect said annular band contact means in a common return circuit.

3. A multiple circuit closer for steering wheels comprising, in combination: a wheel rim having an annular groove; a pair of insulated contact rings exposed in said groove to be placed in connection with individual circuit portions; annular supporting means projecting into said groove between said rings; annular-band, contact means supported on said annular means for depression at either side thereof into contact with a desired ring; means to connect said annular-band contact means in a common return circuit; and a resilient closure for said groove, contacting said annular-band contact means, acting to hold the same normally out of contact with either of said rings.

4. A multiple circuit closer for steering wheels comprising, in combination: a wheel rim having an annular groove; a pair of spaced insulated metallic rings exposed in said groove to be connected in independent circuits; an annular metallic member exposed in said groove between and insulated from said rings to be connected in a common circuit portion; an annular, radially elongated contact member supported on said annular member and overhanging each of said rings; and a resilient closure for said groove overlying said contact member exposed to operating pressure upon each of said overhanging portions.

5. A multiple circuit closer for steering wheels comprising, in combination: a wheel rim having an annular groove; a pair of insulated metallic rings exposed in said groove; a metallic core of said rim having an annular portion projecting into said groove between and insulated from said rings; a contact member comprising a helically-coiled band of wire with its coils flattened and resting at its mid portion on said core, to overhang each of said rings; a resilient closure interlocking with the walls of said groove, overlying said contact member and holding said overhanging portions out of contact with said rings.

6. A multiple circuit closer for steering wheels comprising, in combination: a wheel rim having an annular groove; a pair of spaced insulated metallic rings exposed in said groove; an annular rib projecting into said groove between said rings; a resilient closure for said groove; a pair of helically-coiled bands interlocked with the material of said closure and bearing side by side upon said rib to respectively overhang said rings, means to connect said rings in individual circuits and means to connect said bands in a common return circuit.

7. A multiple circuit closer for steering wheels comprising, in combination: a wheel rim having an annular groove; a pair of spaced insulated metallic rings exposed in said groove; an annular rib projecting into said groove between said rings; a resilient closure for said groove having a pair of grooves at its inner surface; a pair of helically coiled bands each embedded to a depth of more than half of its cross-sectional diameter in one of said grooves to interlock with the material of said closure and bearing side by side upon said rib to respectively overhang said rings; means to connect said rings in individual circuits; and means to connect said bands in a common return circuit.

8. A circuit closer for steering wheels comprising, in combination: a rim having an annular groove formed with an inward projection extending continuously thereabout; a fixed contact exposed in said groove; a movable contact member; a groove closing member overlying said contact member; one of said members formed continuously thereabout with a portion movable to underlapping relation with said projecting portion to hold a circuit closed and releasable therefrom to open said circuit.

9. A circuit closer for steering wheels comprising, in combination: a rim having an annular groove formed with an inward projection and with oppositely located inwardly projecting shoulders, said portion and said shoulders extending continuously about the groove; an upwardly projecting ridge in the bottom of the groove; a flattened annular band of helically coiled wire supported at its mid portion on said ridge and forming a movable contact member; a closure member for said groove overlying said movable contact member; fixed contact rings exposed in said groove one on each side of said ridge; one of said members having a portion extending continuously thereabout by coaction with said inwardly projecting portion serving to hold said contact member in engagement with one of said rings when tilted into such contact; and outwardly projecting portions carried by said closure member underlying said shoulders.

10. A circuit closer for steering wheels comprising, in combination: a rim formed with an annular groove; an upstanding ring portion in the bottom of said groove; an annular band of helically coiled wire flattened perpendicularly to its diameter resting upon and tiltable upon said ridge; means to close respective circuits by tilting said band in either direction; said groove formed with inwardly projecting shoulders; a resilient closure for said groove formed with oppositely projecting lips underlying said shoulders and overlying said band; the material of said lips severed from the remaining portion of said closure upon planes flush with the shoulder contacting surface of said lips through portions of the closure to lessen resistance of the closure to tilting pressure at the sides thereof.

FRED I. GETTY.